(12) United States Patent
Moon et al.

(10) Patent No.: US 11,862,382 B2
(45) Date of Patent: Jan. 2, 2024

(54) SPIRAL COIL AND WIRELESS POWER TRANSMISSION AND RECEPTION CIRCUIT INCLUDING THE SAME

(71) Applicant: ELECTRONICS AND TELECOMMUNICATIONS RESEARCH INSTITUTE, Daejeon (KR)

(72) Inventors: Jung Ick Moon, Daejeon (KR); Gwangzeen Ko, Daejeon (KR); Sang-Won Kim, Sejong-si (KR); Seong-Min Kim, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/078,577

(22) Filed: Dec. 9, 2022

(65) Prior Publication Data
US 2023/0317356 A1 Oct. 5, 2023

(30) Foreign Application Priority Data
Mar. 30, 2022 (KR) .................. 10-2022-0039328

(51) Int. Cl.
*H01F 27/28* (2006.01)
*H01F 27/06* (2006.01)
(Continued)

(52) U.S. Cl.
CPC .......... *H01F 27/2823* (2013.01); *H01F 27/06* (2013.01); *H02J 50/005* (2020.01); *H02J 50/10* (2016.02)

(58) Field of Classification Search
CPC ...... H01F 27/2823; H02J 50/10; H02J 50/005
(Continued)

(56) References Cited

U.S. PATENT DOCUMENTS 8,466,375 B2 6/2013 Cho et al.
10,566,133 B2 * 2/2020 Hui .................. H01F 38/14
(Continued)

FOREIGN PATENT DOCUMENTS

KR 1020190077933 A 7/2019
KR 102213052 B1 2/2021

OTHER PUBLICATIONS

Jei-Ming Jow et al., "Modeling and Optimization of Printed Spiral Coils in Air, Saline, and Muscle Tissue Environments,", IEEE Transactions On Biomedical Circuits and Systems, vol. 3, No. 5, Oct. 2009, pp. 339-347.
(Continued)

*Primary Examiner* — Alfonso Perez Borroto
(74) *Attorney, Agent, or Firm* — Rabin & Berdo, P.C.

(57) ABSTRACT

Provided is a spiral coil and wireless power transmission and reception circuit including the spiral coil. The spiral coil includes a conducting wire forming one or more coil turns, and a height of one side of the conducting wire in a direction of a central portion of the spiral coil and a height of another side of the conducting wire in an opposite direction to the central portion of the spiral coil in each of the coil turns are different from each other and the conducting wire includes at least one slot formed by an empty space between the one side and the other side, and an upper surface positioned above the one side and the other side and connecting the one side and the other side.

15 Claims, 7 Drawing Sheets

(51) Int. Cl.
*H02J 50/00* (2016.01)
*H02J 50/10* (2016.01)

(58) Field of Classification Search
USPC .......................................... 307/104
See application file for complete search history.

(56) References Cited

U.S. PATENT DOCUMENTS

| | | | |
|---|---|---|---|
| 2012/0019075 A1* | 1/2012 | Cho | H02J 50/12 |
| | | | 29/605 |
| 2013/0328409 A1* | 12/2013 | Georgakopoulos | H01F 27/006 |
| | | | 307/104 |
| 2014/0340031 A1* | 11/2014 | Mi | H01F 3/10 |
| | | | 320/108 |
| 2022/0394854 A1 | 12/2022 | Moon et al. | |
| 2023/0120470 A1 | 4/2023 | Moon et al. | |

OTHER PUBLICATIONS

William B. Kuhn et al., "Analysis of Current Crowding Effects in Multiturn Spiral Inductors", IEEE Trans. On. MTT, vol. 49, No. 1, Jan. 2001. pp. 31-38.

* cited by examiner

SPIRAL COIL AND WIRELESS POWER TRANSMISSION AND RECEPTION CIRCUIT INCLUDING THE SAME

CROSS-REFERENCE TO RELATED APPLICATIONS

This application claims the benefit of Korean Patent Application No. 10-2022-0039328 filed on Mar. 30, 2022, in the Korean Intellectual Property Office, the entire disclosure of which is incorporated herein by reference for all purposes.

BACKGROUND

1. Field of the Invention

One or more embodiments relate to a spiral coil and wireless power transmission and reception circuit including the same.

2. Description of the Related Art

Coils are an essential element in designing inductors of general circuits and wireless charging technology that uses magnetic fields. Particularly, since the planar spiral coil for miniaturizing the system uses a printed circuit board (PCB), the metal thickness (or height) is manufactured to be very thin, and the cross-sectional area is small. Therefore, in order to reduce the high resistance caused by the small cross-sectional area, the height of the metal must be increased, but due to the characteristics of the PCB, it is difficult to manufacture a metal thickness of several hundred μm or more, so various efforts are being made, such as adjusting the width or pitch of each turn constituting the coil, or increasing the plating thickness of the metal (nickel, silver, and gold) in the post-processing process.

The resistance of the spiral coil increases due to a skin effect according to frequency; a proximity effect caused by the high charge density concentrated on the edges of each turn in an environment where the pitch between turns is reduced; and an imbalance in the current distribution caused by the effect of the eddy current generated as a reaction to the magnetic field generated from an inductor incident on the metal surface of each turn in the vertical direction.

Meanwhile, with the recent development of three-dimensional (3D) printing technology using copper, it has become possible to manufacture metal models with various structures. Therefore, when this technology is applied to develop a planar spiral coil, various coil models with less loss may be designed.

SUMMARY

Embodiments provide a spiral coil and wireless power transmission and reception circuit including the spiral coil to prevent a resistance reduction effect from decreasing or increasing resistance as a height of a conducting wire increases.

Embodiments provide a spiral coil having a structure maintainable an appropriate thickness of a conducting wire and a wireless power transmission and reception circuit including the spiral coil.

According to an aspect, there is provided a spiral coil that includes a conducting wire forming one or more coil turns, and a height of one side of the conducting wire in a direction of a central portion of the spiral coil and a height of another side of the conducting wire in an opposite direction to the central portion of the spiral coil in each of the coil turns are different from each other and the conducting wire includes at least one slot formed by an empty space between the one side and the other side and an upper surface positioned above the one side and the other side and connecting the one side and the other side.

A vertical cross-section of the upper surface of the conducting wire may have a constant height variation.

A vertical cross-section of the upper surface of the conducting wire may have an inconstant height variation.

The conducting wire may be formed such that the height of the one side is higher than the height of the other side.

The conducting wire may be formed such that the height of the one side is lower than the height of the other side.

A difference between the height of the one side and the height of the other side may be proportional to a width of the conducting wire.

A spiral coil, according to various embodiments, includes a conducting wire forming one or more coil turns, and a height of one side of the conducting wire in a direction of a central portion of the spiral coil and a height of another side of the conducting wire in an opposite direction to the central portion of the spiral coil in each of the coil turns are different from each other and the conducting wire includes at least one slot formed by an empty space between the one side and the other side, and a lower surface positioned under the one side and the other side and connecting the one side and the other side.

A vertical cross-section of the lower surface of the conducting wire may have a flat shape.

A vertical cross-section of the lower surface of the conducting wire may have a non-flat shape.

The conductive wire may be formed such that the height of the one side is higher than the height of the other side.

The conductive wire may be formed such that the height of the one side is lower than the height of the other side.

A difference between the height of the one side and the height of the other side may be proportional to a width of the conducting wire.

According to an aspect, there is provided a wireless power transmission and reception circuit that includes a spiral coil including a conducting wire forming one or more coil turns and a printed circuit board (PCB), and the PCB includes a dielectric and a wire formed on one side of the dielectric to be connected to the spiral coil, and a height of one side of the conducting wire in a direction of a central portion of the spiral coil and a height of another side of the conducting wire in an opposite direction to the central portion of the spiral coil in each of the coil turns are different from each other and the conducting wire includes at least one slot formed by an empty space between the one side and the other side, and an upper surface positioned above the one side and the other side and connecting the one side and the other side.

The wire may be formed to have a same shape as the spiral coil.

The wire may be formed at a fixed position determined to correspond to a shape of the spiral coil.

Additional aspects of embodiments will be set forth in part in the description which follows and, in part, will be apparent from the description, or may be learned by practice of the disclosure.

According to embodiments, a low-loss coil may be manufactured without using a Litz wire in a wireless charging system and a spiral coil may be manufactured advantageously for mass production of an on-board type of wireless power transmission and reception circuit. According to embodiments, a spiral coil that may reduce resistance by several percent or more using the same cross-sectional area or volume of a conducting wire may be provided and may reduce the resistance of a wireless power transmission and reception circuit (e.g., an element such as an antenna and transmission line) using a PCB.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
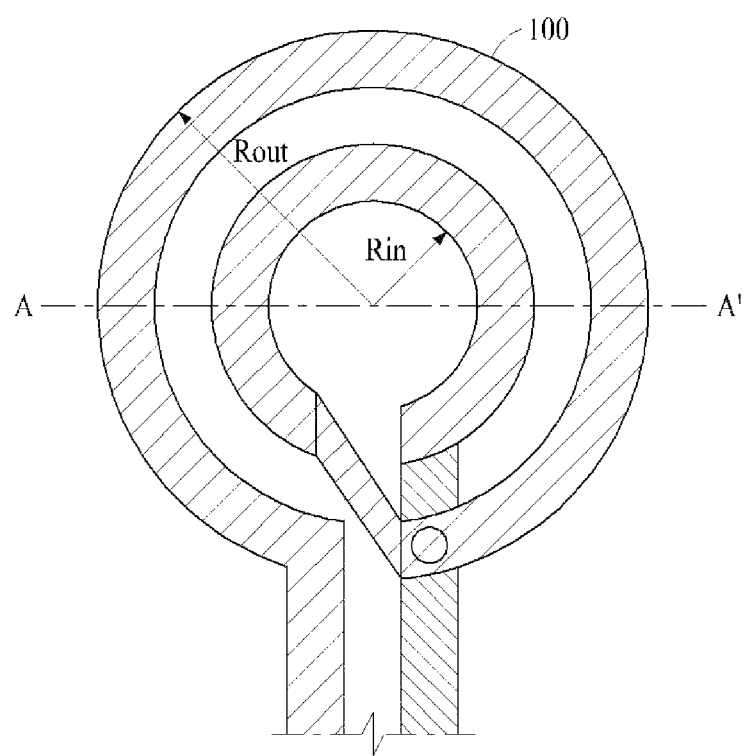
FIG. 1 is a diagram illustrating a structure of a spiral coil according to an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of the embodiments, a detailed description of well-known related structures or functions will be omitted when it is deemed that such description will cause ambiguous interpretation of the present disclosure.

FIG. 1 is a diagram illustrating a structure of a spiral coil 100 according to an embodiment.

FIG. 1 shows the structure of the spiral coil 100 according to an embodiment. The spiral coil 100 may be formed as a circle in which a conducting wire has a constant radius. For example, the conducting wire may form one or more coil turns. FIG. 1 shows the spiral coil 100 in which a coil turn N of the conducting wire is 2.

An inductance of the spiral coil 100 may be improved by increasing a length of the conducting wire. The structure may have an advantage in that the spiral coil 100 may be designed with conducting wires having different radii.

In order to increase the intensity of a magnetic field, a coil in which the same conducting wire is wound several times with the same diameter is physically formed in a helical structure having a plurality of layers, and thus it may be difficult to embed in a small device.

The spiral coil 100 with the structure illustrated in FIG. 1 may solve this problem by designing a single-layer or two-layer structure with different radii of conducting wires. In this case, a distance from a center of the spiral coil 100 as shown in FIG. 1 to a first conducting wire may represent an internal diameter (Rin) and a distance to a last conducting wire may represent an external diameter (Rout).

Figure 2:
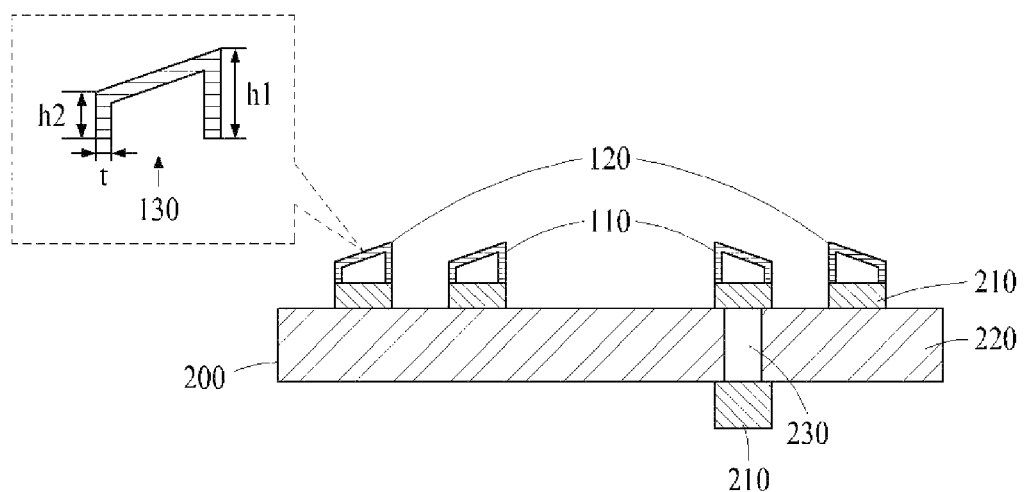
FIG. 2 is a cross-sectional view illustrating a wireless power transmission and reception circuit according to an embodiment.

FIG. 2 is a cross-sectional view illustrating a wireless power transmission and reception circuit according to an embodiment. For example, the cross-section of the spiral coil 100 illustrated in FIG. 2 may represent a cross-section of A-A' in FIG. 1. FIG. 1 may represent an example of the spiral coil 100 including conducting wires 110 and 120 wound with two turns and the cross-section of the spiral coil 100 illustrated in FIG. 2 may represent the conducting wire 110 corresponding to one turn and conducting wire 120 corresponding to two turns. For example, in the conducting wire wound with the number of N turns of the spiral coil 100, a plurality of conducting wires corresponding to each turn may be disposed at regular intervals.

FIG. 2 may be understood as illustrating a cross-sectional view of an embodiment in which the spiral coil 100 of the wireless power transmission and reception circuit according to various embodiments is connected to a printed circuit board (PCB) 200.

For example, the wireless power transmission and reception circuit may include the spiral coil 100 and the PCB 200. For example, the PCB may include at least one of a wire 210, a dielectric 220, and a via-hole 230. The wire 210 of the PCB 200 may be formed on one side or both sides of the dielectric 220, may mean a path for transmitting an electrical signal or power, and may include a metal material. The wire 210 may form a path for transmitting an electrical signal or power according to a pattern. In the PCB 200, the wire 210 positioned above and under the dielectric 220 may be electrically connected through the via-hole 230. As shown in FIG. 2, the spiral coil 100 may be connected to the wire 210 of the PCB 200.

Referring to FIG. 2, the conducting wires 110 and 120, according to an embodiment, may have one side in a central portion direction of the spiral coil 100 and the other side in an opposite direction to a central portion of the spiral coil 100 having different heights in each of the coil turns.

In FIG. 2, in the conducting wires 110 and 120 corresponding to coil turn 1 or coil turn 2, a side in a central portion direction of the spiral coil 100 may refer to one side and a side in an opposite direction to a central portion of the spiral coil 100 may refer to the other side. As shown in FIG. 2, the one side and the other side of the conducting wire 110 corresponding to the coil turn 1 may have different heights. As shown in FIG. 2, the one side and the other side of the conducting wire 120 corresponding to the coil turn 2 may have different heights.

For example, in the conducting wire 120 corresponding to the coil turn 2 shown in an enlarged view in FIG. 2, a height h1 of the one side may be higher than a height h2 of the other side. The height of the one side of the conducting wires 110 and 120 shown in FIG. 2 is the same as h1 and the height of the other side is h2, but the height of the one side and the height of the other side of the conducting wire 110 and the conducting wire 120 may be different.

Referring to FIG. 2, the conducting wire according to an embodiment may include at least one slot 130 formed due to an empty space between the one side and the other side.

In FIG. 2, the slot 130 formed due to an empty space between the one side and the other side of each of the conducting wires 110 and 120 corresponding to the coil turn 1 or coil turn 2 is shown. For example, referring to a portion of the conducting wire 120 corresponding to the enlarged coil turn 2, the slot 130 may be formed between the one side and the other side.

Referring to FIG. 2, the conducting wires 110 and 120 may be positioned above the one side and the other side and include an upper surface connecting the one side and the other side. As shown in FIG. 2, the conducting wires 110 and 120 corresponding to each turn may include the one side, the other side, and the upper surface connecting the one side and the other side.

The spiral coil 100 illustrated in FIG. 2 may lower resistance by having different heights from the one side and the other side. The spiral coil 100 according to an embodiment may lower resistance due to the proximity effect by having different heights from the one side and the other side corresponding to each turn. Since a height of the other side of the conducting wire 110 and a height of the one side of the conducting wire 120 facing each other are different, it is possible to prevent an increase in resistance due to the proximity effect.

The spiral coil 100 illustrated in FIG. 2 may include the slot 130 to lower resistance. When the height of the conductive wires 110 and 120 of the spiral coil 100 increases and becomes greater than the thickness of the skin, the effect of reducing the resistance may decrease, or rather the resistance may increase. The conducting wires 110 and 120 of the spiral coil 100 may include the slot 130 to maintain a thickness t of the conducting wire and reduce resistance.

For example, a difference between the height of the one side and the height of the other side of the conducting wires 110 and 120 may be proportional to a width of the conducting wires 110 and 120. Referring to FIG. 2, a vertical cross-section of the upper surface of the conducting wires 110 and 120 may be formed to have a constant height variation. When the vertical cross-section of the upper surface of the conducting wires 110 and 120 has a constant height variation, the height difference between the one side and the other side of the conducting wires 110 and 120 may be proportional to the width of the conducting wire.

As another example, the difference between the height of the one side and the height of the other side of the conducting wires 110 and 120 may not be proportional to the width of the conducting wires 110 and 120. For example, the height of the upper surface is maintained at h1 in a direction from the one side to the other side of the conducting wires 110 and 120 and the height is reduced by the constant height variation and may be connected to the other side.

As another example, the height of the upper surface is maintained at h1 in a direction from the one side to the other side of the conducting wires 110 and 120 and may extend toward the PCB 200 in a form bent in a vertical direction toward the PCB 200 at a certain point (e.g., half the width of the conducting wires 110 and 120). The upper surface extending toward the PCB 200 may be bent and extended in a direction of the other side at a height h2 and may be connected to the other side. For example, the upper surface may connect the one side and the other side in a step shape.

As another embodiment shown in FIG. 2, the vertical cross-section of the upper surface of the conducting wires 110 and 120 may be formed to have an inconstant height variation. For example, the height of the upper surface from the one side to the other side of the conducting wires 110 and 120 may increase from h1 to h1+h, and then decrease to h2.

Figure 3:
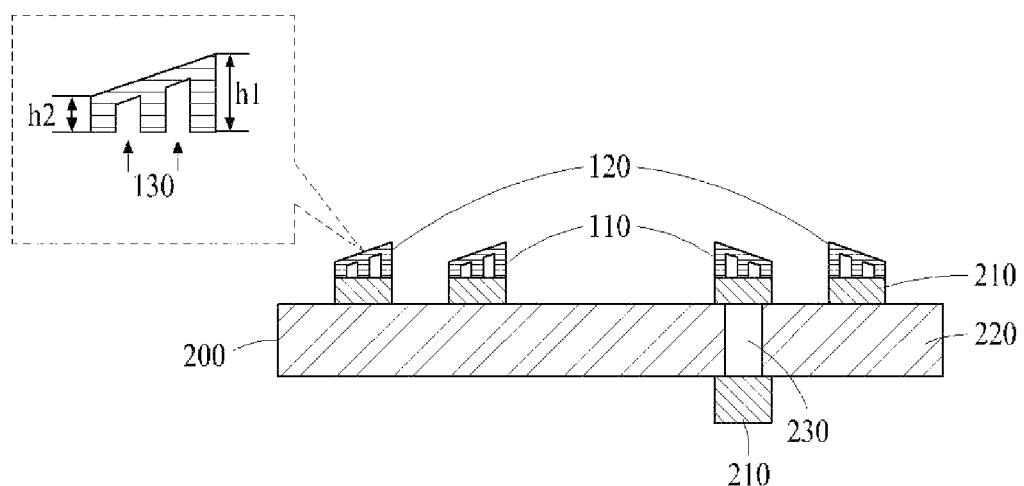
FIG. 3 is a cross-sectional view illustrating a wireless power transmission and reception circuit according to an embodiment.

FIG. 3 is a cross-sectional view illustrating a wireless power transmission and reception circuit according to an embodiment. In the following FIGS. 3 to 7, although descriptions of the same contents as those described with reference to FIGS. 1 and 2 are omitted, substantially the same may be applied. For example, the PCB 200 of FIG. 3 may include the wire 210, the dielectric 220, or the via-hole 230.

Referring to FIG. 3, the spiral coil 100 according to an embodiment may include a plurality of slots 130. For example, each of the conducting wires of the spiral coil 100 shown in FIG. 3 may include two slots 130. Each of the conducting wires 110 and 120 shown in FIG. 3 represents an embodiment including two slots 130 but is not limited thereto and each of the conducting wires 110 and 120 may include one or three or more slots 130.

Figure 4:
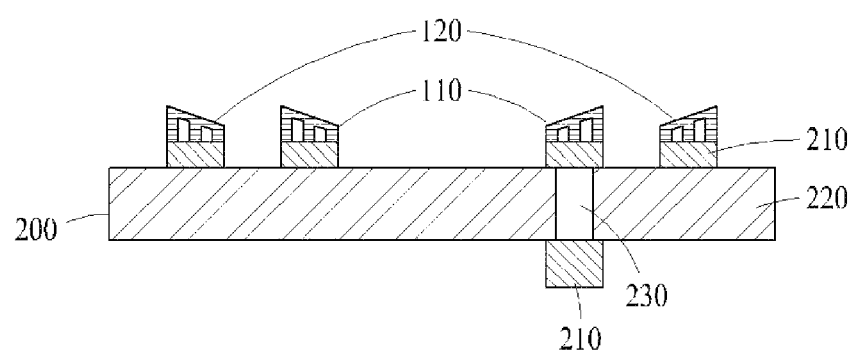
FIG. 4 is a cross-sectional view illustrating a wireless power transmission and reception circuit according to an embodiment.

FIG. 4 is a cross-sectional view illustrating a wireless power transmission and reception circuit according to an embodiment.

Referring to FIG. 4, a height of the one side of the conducting wires 110 and 120 of the spiral coil 100 according to an embodiment may be lower than a height of the other side. As shown in FIG. 4, it may be seen that each of a height h1 of the one side of the conducting wire 110 corresponding to the coil turn 1 and the one side of the conducting wire 120 corresponding to the coil turn 2 is lower than a height h2 of the other side.

Figure 5:
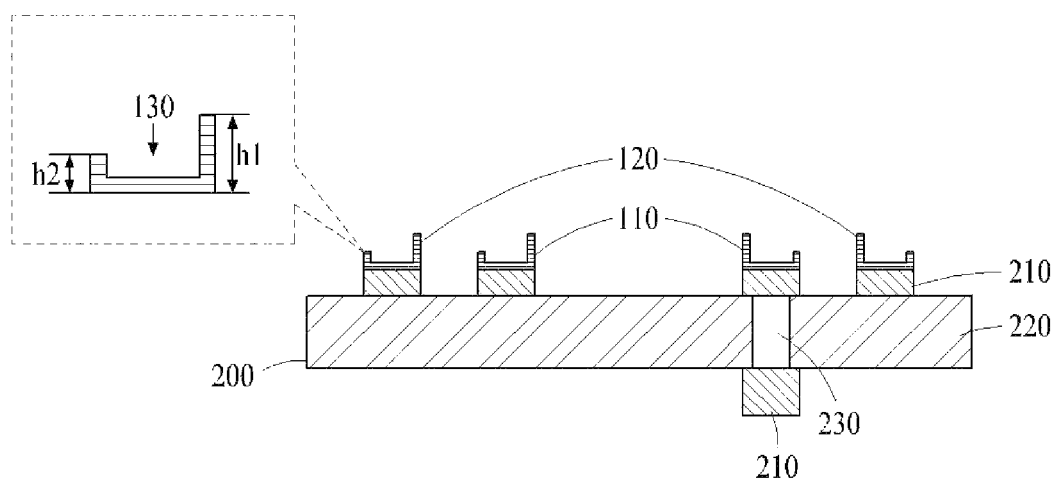
FIG. 5 is a cross-sectional view illustrating a wireless power transmission and reception circuit according to an embodiment.

FIG. 5 is a cross-sectional view illustrating a wireless power transmission and reception circuit according to an embodiment.

Referring to FIG. 5, the conducting wires 110 and 120 according to an embodiment may be positioned under the one side and the other side and may include a lower surface connecting the one side and the other side. In FIG. 5, a height of the one side of the conducting wires 110 and 120 is h1 and a height of the other side is h2, and the height h1 of the one side may be higher than the height h2 of the other side.

The lower surface is positioned under the one side and the other side and may connect the one side and the other side. In FIG. 5, one or more slots 130 may be formed between the one side and the other side. Although the lower surface shown in FIG. 5 illustrates an example having a flat shape, the lower surface may have a shape different from that of the lower surface illustrated in FIG. 5.

As another embodiment shown in FIG. 5, the conducting wires 110 and 120 including the lower surface may include the plurality of slots 130. For example, the plurality of slots 130 may be formed by forming a separator extending upward from the lower surface of the conducting wires 110 and 120.

As another embodiment shown in FIG. 5, the height of the one side of the conducting wires 110 and 120 including the lower surface may be lower than the height of the other side.

As another embodiment shown in FIG. 5, the lower surface may have a non-flat shape. For example, the lower surface may extend horizontally from a lower end of the one side to a certain width (e.g., half the width of the conducting wire) of the conducting wires 110 and 120 in a direction to the other side, may extend from a certain width of the conducting wires 110 and 120 to a certain height in a vertical direction, may extend horizontally in a direction to the other side and may be connected to a lower end of the other side. As described above, the lower surface may be connected to the lower end of the other side in a step shape from the lower end of the one side. When the lower surface has a step shape as described above, the lower surface of the conducting wires 110 and 120 may be connected to the wire 210 in some regions.

Figure 6A:
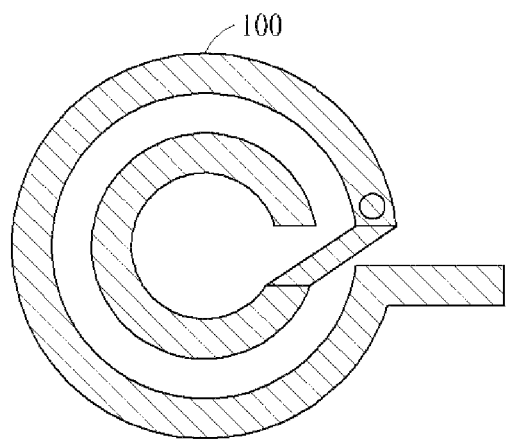
FIGS. 6A to 6C are diagrams illustrating a wireless power transmission and reception circuit according to an embodiment.
Figure 6B:
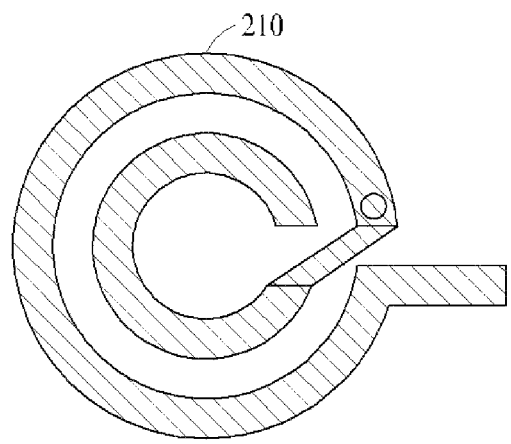
Figure 6C:
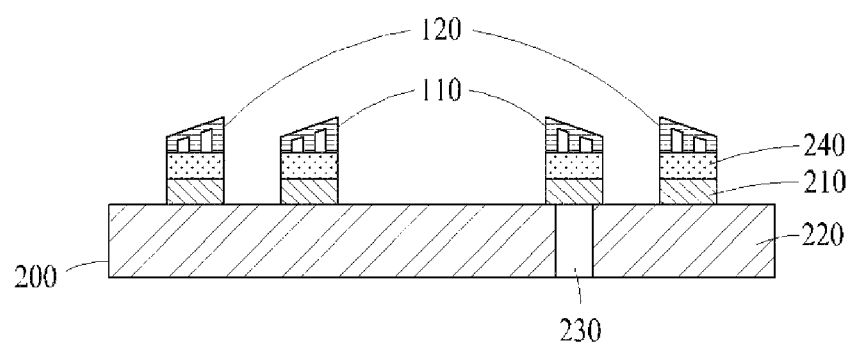

FIGS. 6A to 6C are diagrams illustrating a wireless power transmission and reception circuit according to an embodiment.

FIG. 6A illustrates the spiral coil 100 according to an embodiment, FIG. 6B illustrates the wire 210 formed on the PCB 200 according to an embodiment, FIG. 6C is a cross-sectional view illustrating a wireless power transmission and reception circuit including the PCB 200 and the spiral coil 100 connected to the PCB 200. FIGS. 6A and 6B may be understood as showing an upper side view of the spiral coil 100 and the wire 210.

Referring to FIG. 6, the wire 210 according to an embodiment may be formed to have the same shape as the spiral coil 100. For example, the wire 210 may be formed on the one side of the dielectric 220 in the same shape as the shape of the spiral coil 100. The shape of the wire 210 of FIG. 6B may have the same shape as the shape of the spiral coil 100 in FIG. 6A.

As shown in FIG. 6C, the spiral coil 100 of FIG. 6A may be connected to the wire 210 formed in the shape of FIG. 6B on the PCB 200. For example, soldering 240 may be further formed between the wire 210 of the PCB 200 and the spiral coil 100.

FIGS. 7A to 7D are diagrams illustrating a wireless power transmission and reception circuit according to an embodiment.

Referring to FIG. 7, the wire 210 according to an embodiment may be formed at a fixed position determined to correspond to the shape of the spiral coil 100.

Figure 7A:
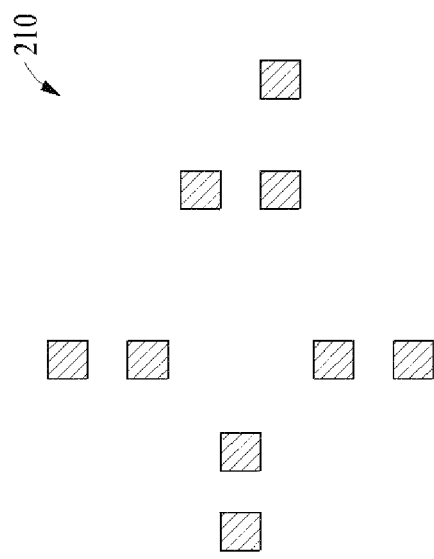
FIGS. 7A to 7D are diagrams illustrating a wireless power transmission and reception circuit according to an embodiment.
Figure 7B:
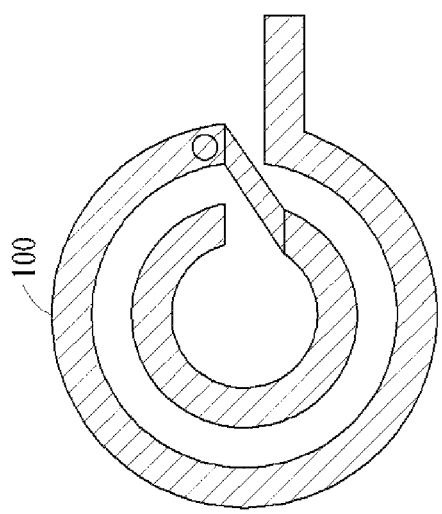

FIG. 7A is a diagram illustrating a shape of the spiral coil 100 according to an embodiment, and FIG. 7B is a diagram illustrating a shape of the wire 210 according to an embodiment. The wire 210 of FIG. 7B may be formed at fixed positions corresponding to the shape of the spiral coil 100. The wire 210 shown in FIG. 7B may be formed on the one side of the dielectric 220 of the PCB 200.

Figure 7C:
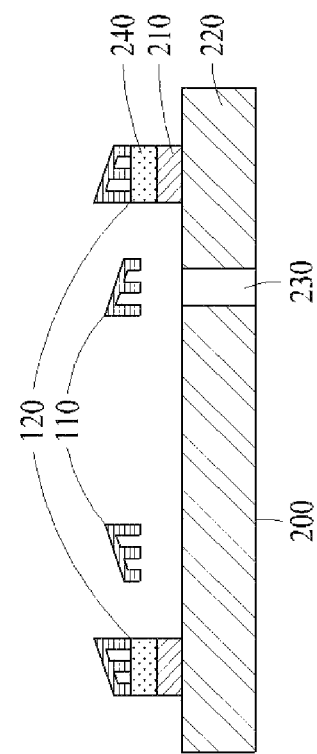
Figure 7D:
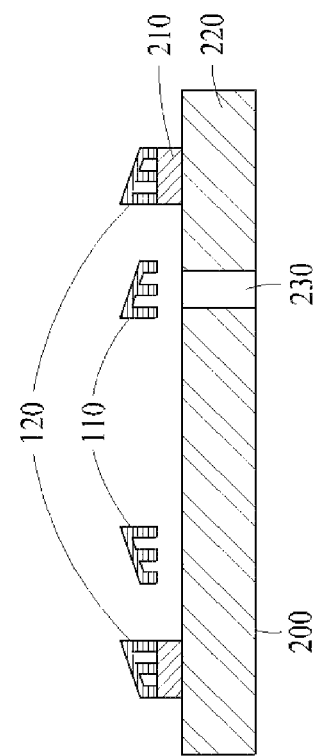

As shown in FIG. 7C or FIG. 7D, the spiral coil 100 of FIG. 7A may be connected to the wire 210 formed in the shape of FIG. 7B on the PCB 200. For example, as shown in FIG. 7C, the wire 210 and the spiral coil 100 may be directly connected or the soldering 240 between the wire 210 and the spiral coil 100 of the PCB 200 as shown in FIG. 7D may be further formed.

As shown in FIGS. 7C and 7D, a portion of the spiral coil 100 corresponding to the wire 210 formed at a fixed position may be connected to the wire 210 of the PCB 200. For example, in the cross-section of the wireless power transmission and reception circuit, the conducting wire 110 may not be connected to the wire 210 but the conducting wire 120 may be connected to the wire 210. In the cross-section of the wireless power transmission and reception circuit at another location, unlike the embodiment shown in FIG. 7C or 7D, a cross-section in which the conducting wire 110 is connected to the wire 210 and the conducting wire 120 is not connected to the wire 210 may appear.

In FIGS. 6 and 7, examples in which the height of the one side of the conducting wire shown in FIG. 3 is higher than the height of the other side, and the spiral coil 100 including two slots 130 is connected to the PCB 200 are shown, but the spiral coil 100, different from the spiral coil shown in FIGS. 6 and 7, may be connected to the PCB 200 substantially the same as those shown in FIGS. 6 and 7.

For example, the connection of the spiral coil 100 to the PCB 200 may mean a mechanical connection and/or electrical connection between the PCB 200 and the spiral coil 100.

The spiral coil 100 described above may be manufactured using 3D metal printing. For example, the spiral coil 100 may be easily manufactured by the 3D metal printing, and due to the shape of the conducting wire of the spiral coil 100, the spiral coil 100 may have a low resistance.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

Although the present specification includes details of a plurality of specific to embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. A spiral coil, comprising:
a conducting wire forming one or more coil turns,
wherein a height of one side of the conducting wire in a direction of a central portion of the spiral coil and a height of another side of the conducting wire in an opposite direction to the central portion of the spiral coil in each of the coil turns are different from each other, and
wherein the conducting wire comprises:
at least one slot formed by an empty space between the one side and the other side; and
an upper surface positioned above the one side and the other side and connecting the one side and the other side.

2. The spiral coil of claim 1, wherein a vertical cross-section of the upper surface of the conducting wire has a constant height variation.

3. The spiral coil of claim 1, wherein a vertical cross-section of the upper surface of the conducting wire has an inconstant height variation.

4. The spiral coil of claim 1, wherein the conducting wire is formed such that the height of the one side is higher than the height of the other side.

5. The spiral coil of claim 1, wherein the conducting wire is formed such that the height of the one side is lower than the height of the other side.

6. The spiral coil of claim 1, wherein a difference between the height of the one side and the height of the other side is proportional to a width of the conducting wire.

7. A spiral coil, comprising:
a conducting wire forming one or more coil turns,
wherein a height of one side of the conducting wire in a direction of a central portion of the spiral coil and a height of another side of the conducting wire in an opposite direction to the central portion of the spiral coil in each of the coil turns are different from each other, and
wherein the conducting wire comprises:
at least one slot formed by an empty space between the one side and the other side; and
a lower surface positioned under the one side and the other side and connecting the one side and the other side.

8. The spiral coil of claim 7, wherein a vertical cross-section of the lower surface of the conducting wire has a flat shape.

9. The spiral coil of claim 7, wherein a vertical cross-section of the lower surface of the conducting wire has a non-flat shape.

10. The spiral coil of claim 7, wherein the conducting wire is formed such that the height of the one side is higher than the height of the other side.

11. The spiral coil of claim 7, wherein the conducting wire is formed such that the height of the one side is lower than the height of the other side.

12. The spiral coil of claim 7, wherein a difference between the height of the one side and the height of the other side is proportional to a width of the conducting wire.

13. A wireless power transmission and reception circuit, the circuit comprising:
a spiral coil comprising a conducting wire forming one or more coil turns; and
a printed circuit board (PCB),
wherein the PCB comprises:
a dielectric; and
a wire formed on one side of the dielectric to be connected to the spiral coil,
wherein a height of one side of the conducting wire in a direction of a central portion of the spiral coil and a height of another side of the conducting wire in an opposite direction to the central portion of the spiral coil in each of the coil turns are different from each other, and
wherein the conducting wire comprises:
at least one slot formed by an empty space between the one side and the other side; and
an upper surface positioned above the one side and the other side and connecting the one side and the other side.

14. The circuit of claim 13, wherein the wire is formed to have a same shape as the spiral coil.

15. The circuit of claim 13, wherein the wire is formed at a fixed position determined to correspond to a shape of the spiral coil.

* * * * *